United States Patent [19]

Huber et al.

[11] Patent Number: 5,667,359
[45] Date of Patent: Sep. 16, 1997

[54] CLEARANCE CONTROL FOR THE TURBINE OF A GAS TURBINE ENGINE

[75] Inventors: Frank W. Huber, Palm Beach Gardens; Douglas J. Dietrich, West Palm Beach, both of Fla.

[73] Assignee: United Technologies Corp., Hartford, Conn.

[21] Appl. No.: 236,094

[22] Filed: Aug. 24, 1988

[51] Int. Cl.[6] .................... F01D 5/18; F01D 5/20
[52] U.S. Cl. ........................... 416/96 A; 416/97 R
[58] Field of Search ...................... 416/92, 96 A, 416/97 R, 97 A; 415/172 A, 172.1

[56] References Cited

U.S. PATENT DOCUMENTS

| 3,533,712 | 10/1970 | Kercher | 416/92 |
|---|---|---|---|
| 3,810,711 | 5/1974 | Emmerson et al. | 416/97 A |
| 3,854,842 | 12/1974 | Caudill | 415/172 A X |
| 3,899,267 | 8/1975 | Dennis et al. | 416/92 |
| 3,994,622 | 11/1976 | Schultz et al. | 416/92 |
| 4,142,824 | 3/1979 | Andersen | 416/92 X |
| 4,171,184 | 10/1979 | Lings et al. | 416/96 A X |
| 4,390,320 | 6/1983 | Eiswerth | 416/97 R |
| 4,411,597 | 10/1983 | Koffel et al. | 416/92 |
| 4,519,745 | 5/1985 | Rosman et al. | 416/96 A |
| 4,540,339 | 9/1985 | Horvath | 416/92 |
| 4,589,823 | 5/1986 | Koffel | 416/92 |
| 4,606,701 | 8/1986 | McClay et al. | 416/92 |
| 4,753,575 | 6/1988 | Levengood et al. | 415/115 X |

FOREIGN PATENT DOCUMENTS

| 104506 | 8/1980 | Japan | 416/96 A |
|---|---|---|---|
| 47104 | 3/1983 | Japan | 416/92 |
| 2158160 | 11/1985 | United Kingdom | 415/172 A |

*Primary Examiner*—Charles T. Jordan
*Assistant Examiner*—Christopher K. Montgomery
*Attorney, Agent, or Firm*—Norman Friedland

[57] ABSTRACT

An aerodynamic buffer zone in the gap between the tip of an air cooled axial flow turbine blade of a gas turbine engine and its surrounding shroud or seal (outer air seal) is created by discretely discharging a high velocity stream of cooling air from the tip of the blade in a judicious direction. The stream is angularly oriented relative to the plane of rotation of the turbine so that it is discharged in the gap in the direction of the pressure side of the turbine and preferably at between a 15°–45° angle relative to the flat surface of the tip of the blade.

8 Claims, 2 Drawing Sheets

FIG. 5
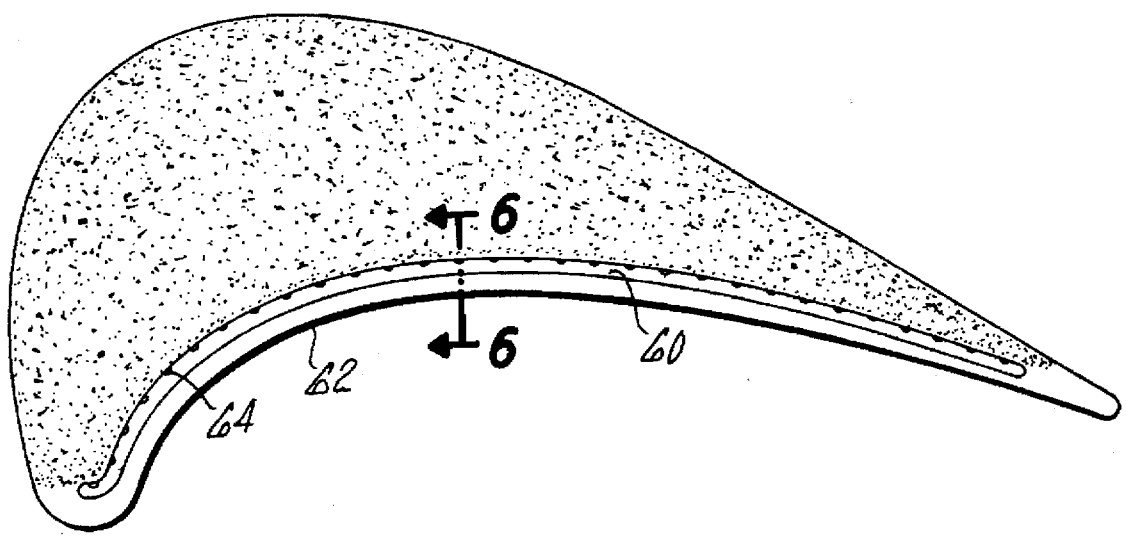
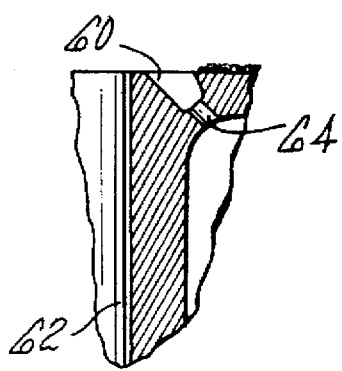
FIG. 6

5,667,359

CLEARANCE CONTROL FOR THE TURBINE OF A GAS TURBINE ENGINE

Claims 1 and 2 were made in performance of work done on a Government contract and the Government has rights under these claims.

CROSS REFERENCE TO RELATED APPLICATIONS

The subject matter of this application is related to the subject matter of commonly owned U.S. patent applications Ser. Nos. 07/236,092 and 07/236,093 filed on even date herewith and each bearing the title "Cooled Blades for a Gas Turbine Engine".

TECHNICAL FIELD

This invention relates to gas turbine engines and particularly to means for minimizing the parasitic leakage at the tips of axial turbine blades.

BACKGROUND ART

As is well known, in order to improve engine performance the aircraft engine industry has expended a great effort in its attempts to minimize the gap between the outer air seal or shroud and the tip of the turbine blades of aircraft gas turbine engines. For example, U.S. Pat. No. 4,069,662, granted to I. Redinger et al on Jan. 24, 1978 and assigned to United Technologies Corporation, the assignee of this patent application, discloses an active clearance control system that selectively impinges air on the engine's casing to shrink the casing and move the outer air seals closer to the tips of the turbine blades. Other systems have passively attempted to reduce the gap by flowing air at different temperature levels in proximity to the outer air seals to cause them to contract or expand.

Also well known is that the complexity of the problem is directly related to the use for which the engine will be put. For example, the maneuvers associated with fighter aircraft put demands on the aircraft engine that far outweigh those demanded by a commercial aircraft. The pilot of a fighter aircraft will select many more bodies, chops and transitory conditions than would a pilot of a commercial airliner. These conditions obviously impact the design of the engine which is particularly true of the turbine rotor's space relations to the outer air seal. These demands by the pilot cause heating and cooling of the turbine section structure, such that the shrinking and expansion and their rates affect the turbine parasitic leakage problem. Hence, any technical contribution that serves to reduce the gap while allowing the turbine to operate without undue rubbing the outer air seals is considered to be very important and significant since the leakage impacts the overall performance of the engine.

We have found that we can reduce the parasitic leakage by discretely discharging a portion of the cooling air internally of the turbine blades from the tip of the blade in a particular direction.

SUMMARY OF THE INVENTION

An object of this invention is to provide an improved rotor of the type that includes internal cooled turbine blades for aircraft gas turbine engines.

A feature of this invention is to direct the air discharged from the airfoil of a turbine blade into the gas stream adjacent the tip of the blade in such a manner that reduces aerodynamic losses by reducing the effective tip clearance and desensitizes the blade to increased tip clearance.

A still further object is to direct the cooling air discharging from the tip of the airfoil of the turbine blade of a gas turbine engine in the direction of the pressure side of the airfoil and at a preferable angle of 15° and a maximum acceptable angle of 45° relative to a radial line through the axis of rotation or the surface of the tip of the blade, and the discharging air should be at a relatively high pressure.

The foregoing and other features and advantages of the present invention will become more apparent from the following description and accompanying drawings.

BRIEF DESCRIPTION OF THE DRAWINGS

FIG. 5 is a top plan view of the tip of the airfoil section showing another embodiment of this invention; and FIG. 6 is a section taken through lines 6—6 of FIG. 5.

BEST MODE FOR CARRYING OUT THE INVENTION

This invention is particularly efficacious for turbine blades of a gas turbine engine where internal cooling of the blades is desired. The construction of internally cooled turbine blades is well described in the literature and, for the sake of convenience and simplicity, only that portion of the blade will be described herein that is necessary for an understanding of the invention. For details of gas turbine engines and turbine blades, reference should be made to the F100 and JT9D engines manufactured by Pratt & Whitney Aircraft, a division of United Technologies Corporation, the assignee of this patent application and the patents mentioned above.

Figure 1:
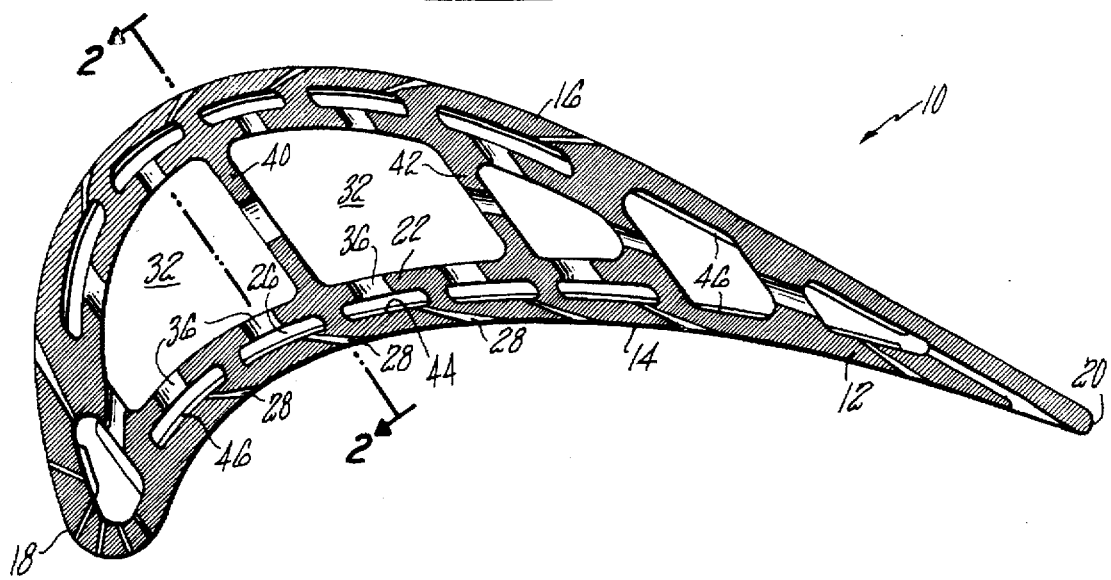
FIG. 1 is a sectional view of a turbine blade taken along a chordwise axis illustrating this invention.
Figure 2:
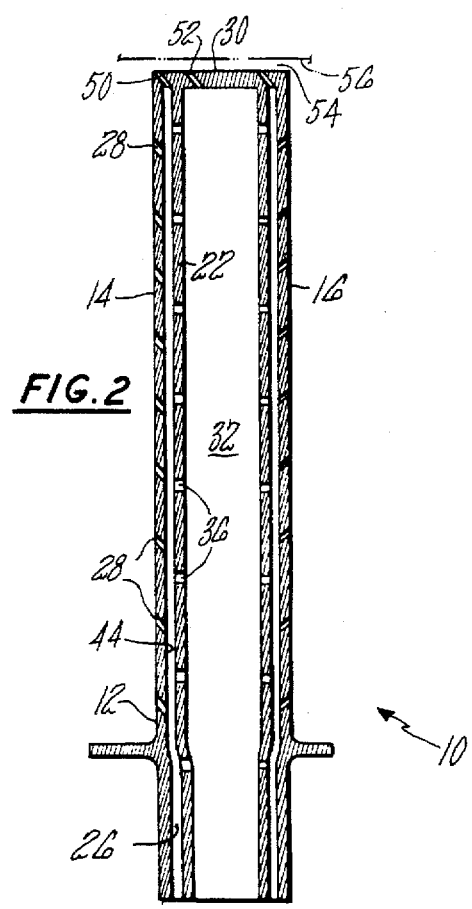
FIG. 2 is a sectional view taken along lines 2—2 of FIG. 1.

As can be seen in FIG. 1, which is a cross-sectional view taken along the chordwise axis, and FIG. 2, the blade, generally illustrated by reference numeral 10, comprises an outer wall or shell 12 defining a pressure surface 14, a suction surface 16, a leading edge 18 and trailing edge 20. The blade 10 is cast into a double wall configuration wherein the inner wall 22 is generally coextensive and parallel to the outer shell 12 but is spaced therefrom to define a radially extending passage 26. Since this passage 26 feeds cooling air to the film cooling holes 28, passage 26 is referred to as the feed channel. While feed channel 26 is shown as a plurality of feed channels, the number of such passages will be predicated on the particular application. This is a dynamic rather than static passage since cool air is constantly flowing inasmuch as it is continuously being fed cooling air and a portion of the air continuously is being discharged at the tip through orifice 50. This is best seen in FIG. 2 showing schematically that cool air enters the bottom of feed channel 26 and flows radially toward the tip 30 of the blade.

Cooling air is also continuously flowing to the central cavity, which is a radially extending passage 32. It also is a dynamic passage since it is continuously being fed cooling air and a portion of the cooling air at the tip discharges through orifice 52. As will be apparent from the description to follow, inasmuch as this cavity feeds cooling air to feed channel 26 to replenish the supply of cooling air as it is being exhausted through the film cool holes 28, it is hereinafter referred to as the feed chamber 32.

It is contemplated that feed channel 26 and feed chamber 32 will receive compressor air as is typical in these designs.

It is apparent from the foregoing as the cooling air in the feed channel 26 progresses radially from the root toward the tip of the blade and feeds the radially spaced film holes 28, the cooling air becomes depleted. However, since feed channel 26 is always in communication with feed chamber 32 by the radially spaced holes 36, the supply of cooling air is continuously being replenished. Obviously, the cooling air in feed channel 26 and feed chambers 32 is being pressurized as it progresses toward the tip of the blade by virtue of the rotation of the blade. Because of this inherent feature, the film cooling holes in proximity of the tip of the blade are in a position to receive cooling air at an acceptable pressure level.

In heretofore designs, the specified pressure of the cooling air at the tip of the blade was predicated on the inlet pressure at the root of the blade. Hence, the higher specified pressures required higher inlet pressures. This presented a problem to the designer in trying to avoid leakage when flowing the cooling air from the source through a non-rotating section to the rotating blade passages.

The feed chamber 32 is generally a hollow cavity extending from the root to the tip and is bounded by the inner wall 22. Ribs such as ribs 40 and 42 may be incorporated to provide structural integrity to the blade. The use of ribs, of course, will be predicated on the particular design of the blade and its application.

Because holes 36 serve to direct cooling air against the inner surface 44 of the outer shell, they are hereinafter referred to as replenishment cooling holes 36. Thus, the replenishment cooling holes serve, among other functions, means for replenishing the feed channel 26 and means for enhancing cooling effectiveness by introducing turbulence of the flow entering the film cooling holes. It has been found that replenishing the feed channels by the replenishment holes 36 has shown a significant improvement in the cooling effectiveness over a blade tested absent the replenishment cooling holes. The size of these holes may be selected to provide the desired pressure drop to achieve the desired pressure ratio across the film cooling holes.

Cooling may further be enhanced by incorporating trip strips 46 in feed channel 26. The trip strips serve an additional function besides the cooling aspect in that they create a pressure drop feature. This may be desirable where the cooling air approaching the tip of the blade owing to the centrifuging of the air in the feed channel 26 and feed chamber 32 becomes over-pressurized and it is necessary to reduce this pressure to attain the pressure ratio necessary for optimizing the formation of the film egressing from the film cooling holes 28.

From the foregoing, it is apparent that the feed channel 26 and feed chamber 32 are straight through radial passages and eliminate the generally used serpentine passages. This feature allows the designer of the blade to reduce the tip size since it no longer has to accommodate the turning passages of the serpentine passage design and now allows the designer to apply aerodynamic tip sealing techniques. This permits the aerodynamic designer to select the blade tip chordal length at the minimum required by aerodynamic performance considerations without undue regard to internal cooling size demands. Of course, this feature carries with it several advantages that are desirable in turbine design. By taking advantage of this feature, the blade can be made lighter, it has a significantly reduced pull and the disk, supporting the blade, can be made lighter. All of these features favorably influence the weight, performance and life of the turbine.

Figure 3:
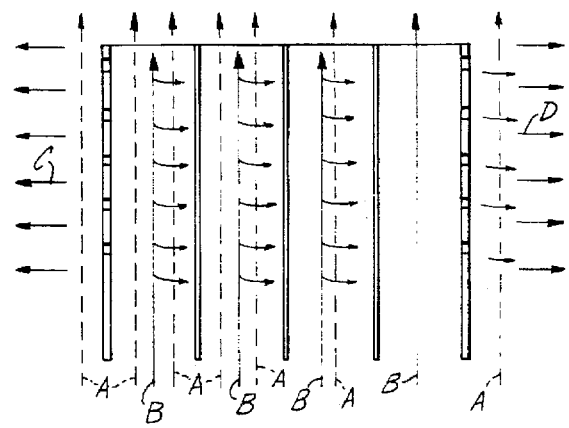
FIG. 3 is a flow circuit diagram illustrating the flow patterns internally of the turbine blade.

In operation and referring to the flow circuit in FIG. 3, cooling air enters the blade at the root section at the lower extremity of the blade and progresses through the airfoil section to the tip as illustrated by the dash arrow lines A and straight arrow lines B. Holes in the tip allow a portion of the air to be expelled in this location, a portion of the cooling air flows to the shower head at the LE and a portion of cooling air is directed to the TE as represented by the horizontal arrow lines C and D respectively.

As the air progresses radially outward toward the tip, the air in the feed chamber (arrow B) continuously replenishes the air in the feed channel (arrow A). Hence, the feed channel is constantly being supplied with cooling air. Because of the pumping action associated with the rotation of the blades, the pressure at the tip where it is most needed is inherently generated. This assures that the proper pressure ratio across the film holes is maintained along the entire surface of the shell.

Since the inner wall replaces the ribs that formed the serpentine passages, the inner wall serves as a heat transfer surface to provide the same heat convection feature that is attributed to the serpentine design.

In accordance with this invention and as best seen in FIG. 2, the orifices 50 and 52 are oriented so that the flow discharging out of the feed channels 26 and feed chamber 32 is directed toward the pressure side of the blade at an angle substantially equal to 40° to 45°. The angle is measured from the flat surface of the tip of the blade and will vary at different stations of the airfoil. Preferably, the angle will be at a minimum value, say 15°, but should not exceed 45°. This serves to create a buffer zone at the tip of the blade in the gap 54 between the tip and the schematically shown shroud 56 surrounding the blade. Since the discharging flow through orifices 50 and 52 has had the benefit of the blade's pumping action, the velocity at which the flow is being discharged is significantly high to effectuate a reduction of the aerodynamic losses otherwise occurring in this gap and effectively desensitize the blade to tip clearance.

Figure 4:
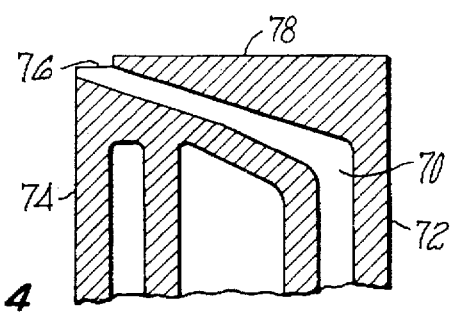
FIG. 4 is a partial view in section of the tip of a turbine blade showing a preferred embodiment of this invention.

FIG. 4 shows a preferred embodiment of a turbine blade where the radial passage 70 crosses over the airfoil from the suction side 72 so that the air discharges at the tip adjacent the pressure side 74. The discharge orifice 76 is oriented with the flat surface 78 of the tip of the blade so that it forms a 20° angle.

FIGS. 5 and 6 exemplify another embodiment of this invention where the tip of the blade is grooved to define a coolant pocket 60 adjacent the pressure side 62 of the blade. The discharge holes 64, in this instance, are angled to provide a buffer zone adjacent the tip of the blade to provide an aerodynamic seal to reduce the leakage of the engine working medium occurring in this gap.

Although this invention has been shown and described with respect to detailed embodiments thereof, it will be understood by those skilled in the art that various changes in form and detail thereof may be made without departing from the spirit and scope of the claimed invention.

We claim:

1. An axial flow turbine for a gas turbine engine in combination with an annular shroud surrounding said turbine, said turbine including a plurality of internally air cooled turbine blades each having a tip section mounted adjacent said shroud and defining therewith a gap that is susceptible of leaking engine working medium, each of said internally cooled blades having an airfoil surface exposed to said engine working medium defining a pressure surface and a suction surface, means for minimizing said leakage by providing a buffer zone in said gap, said means including an orifice means located in said tip section adjacent said pressure surface and said orifice being skewed relative to the rotation axis of said blade for leading air from internally of said blade into said gap toward the pressure side of said blades whereby the stream of air discharging from said orifice means defines a buffer zone so as to minimize parasitic leakage of said engine working medium.

2. An axial flow turbine as claimed in claim 1 wherein said airfoil section also defines a leading edge and trailing edge and said blade including a pocket formed in said tip extending substantially adjacent the leading edge to substantially adjacent said trailing edge and being in proximity to said pressure surface, and said orifice means includes a plurality of spaced skewed holes in said pocket leading air internally of said blade into said gap.

3. An axial flow turbine for a gas turbine engine in combination with an outer air seal surrounding said turbine, said turbine including a plurality of internally air cooled blades including a plurality of passageways for conducting air internally of said blade, said blade having an airfoil surface defining a tip section, a root section, a leading edge, a trailing edge, a pressure surface and a suction surface, at least one of said passageways extending radially straight through for conducting cooling air from said root section to said tip section having a relatively flat outer surface, said one passageway feeding a plurality of film cool holes radially spaced in said airfoil surface, said passageway being replenished with cooling air from another of said passageways through replenishment holes spaced radially along said one passageway, said outer air seal and said tip section defining a gap susceptible of parasitic leakage of engine working medium used in powering said turbine, means for minimizing said parasitic leakage including an orifice in said tip communicating with said one passageway and being oriented to discharge cooling air angularly with respect to the axis of rotation of said turbine and oriented in a direction toward said pressure side, and a source of cooling air supplying air to said root section for feeding cooling air to said passageways including said one passageway.

4. An axial flow turbine as claimed in claim 3 wherein said angle of said orifice is substantially equal to 15°–45° relative to said flat outer surface.

5. An axial flow turbine as in claim 3 wherein said blade includes a mid chord section, a radial straight through passageway in said mid chord section extending from said root section to said tip section and being substantially parallel to said one passageway, said mid chord section having radially spaced holes communicating with said one passageway for replenishing cooling air to said one passageway to compensate for the cooling air used to feed said film cooling holes.

6. An axial flow turbine as in claim 5 wherein passageways adjacent said pressure surface and said suction surface and said mid chord section include at least one orifice discharging air from said tip section into said gap and being skewed relative to the rotational axis of said turbine and oriented to discharge cooling air toward said pressure surface.

7. An axial flow turbine as in claim 6 wherein said tip has a flat surface and the angle of all of said orifices is substantially equal to between 15°–45° relative to said flat surface.

8. An axial flow turbine as in claim 5 wherein said passageway adjacent said suction surface is routed through the airfoil to discharge at said tip section adjacent said pressure surface.

* * * * *